United States Patent
Calman et al.

(10) Patent No.: US 9,519,923 B2
(45) Date of Patent: *Dec. 13, 2016

(54) SYSTEM FOR COLLECTIVE NETWORK OF AUGMENTED REALITY USERS

(71) Applicant: BANK OF AMERICA CORPORATION, Charlotte, NC (US)

(72) Inventors: Matthew A. Calman, Charlotte, NC (US); Erik Stephen Ross, Charlotte, NC (US); Alfred Hamilton, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/045,182

(22) Filed: Feb. 16, 2016

(65) Prior Publication Data
US 2016/0162964 A1    Jun. 9, 2016

Related U.S. Application Data

(63) Continuation of application No. 13/342,059, filed on Jan. 1, 2012, now Pat. No. 9,317,860.
(Continued)

(51) Int. Cl.
*G06Q 30/06* (2012.01)
*G06Q 30/02* (2012.01)
(Continued)

(52) U.S. Cl.
CPC .......... *G06Q 30/0605* (2013.01); *G06Q 30/02* (2013.01); *G06Q 30/0613* (2013.01);
(Continued)

(58) Field of Classification Search
CPC .................................................. G06Q 30/06
(Continued)

(56) References Cited

U.S. PATENT DOCUMENTS

| | | |
|---|---|---|
| 3,055,513 A | 9/1962 | Kralowetz |
| 3,173,269 A | 3/1965 | Imbertson |
| (Continued) | | |

FOREIGN PATENT DOCUMENTS

| | | |
|---|---|---|
| JP | 2007266143 | 10/2007 |
| KR | 1020090047614 A | 5/2009 |
| KR | 1020090105734 A | 10/2009 |

OTHER PUBLICATIONS

Edwards, Lin. "Augmented Reality Systems Appearing in Japanese Shopping Malls." Phys Org, Dec. 9, 2009. (http://phys.org/news/2009-12-augmented-reality-japanese-malls.html).*

(Continued)

*Primary Examiner* — Resha Desai
*Assistant Examiner* — Jennifer Lee
(74) *Attorney, Agent, or Firm* — Michael A. Springs; Moore & Van Allen PLLC; W. Kevin Ransom

(57) ABSTRACT

Embodiments of the invention provide for using video analysis, such as augmented reality or the like to assist a group of users to utilize mobile devices for creating a collective network environment of users that identifies objects in which one or more users in a group of users may be interested, and notifies the one or more users of information associated with the object. A collective network comprises a group of users that each have a mobile device that contains or is otherwise operatively coupled to a data capture device. For example, the mobile device may be a mobile phone that is capable of taking video with a camera device. A user in the collective network may capture video on his mobile device, and an application can identify the object in the video and provide interested users in the collective network with information about the object.

16 Claims, 8 Drawing Sheets

Related U.S. Application Data

(60) Provisional application No. 61/478,417, filed on Apr. 22, 2011, provisional application No. 61/450,213, filed on Mar. 8, 2011.

(51) Int. Cl.
  *G06T 19/00* (2011.01)
  *G09G 5/00* (2006.01)
  *G06Q 50/00* (2012.01)
  *H04L 29/06* (2006.01)

(52) U.S. Cl.
  CPC ..... *G06Q 30/0623* (2013.01); *G06Q 30/0635* (2013.01); *G06Q 30/0641* (2013.01); *G06Q 50/01* (2013.01); *G06T 19/006* (2013.01); *G09G 5/003* (2013.01); *H04L 65/403* (2013.01); *H04L 65/60* (2013.01); *G09G 2370/022* (2013.01)

(58) Field of Classification Search
  USPC .................................................. 705/26.1–27.2
  See application file for complete search history.

(56) References Cited

U.S. PATENT DOCUMENTS

| | | |
|---|---|---|
| 3,925,196 A | 12/1975 | Sinfelt et al. |
| 3,928,165 A | 12/1975 | Piester |
| 3,996,263 A | 12/1976 | Sakai et al. |
| 5,638,457 A | 6/1997 | Deaton et al. |
| 5,768,633 A | 6/1998 | Allen et al. |
| 6,055,513 A | 4/2000 | Katz et al. |
| 6,173,269 B1 | 1/2001 | Solokl et al. |
| 6,202,055 B1 | 3/2001 | Houvener et al. |
| 6,266,649 B1 | 7/2001 | Linden et al. |
| 6,522,772 B1 | 2/2003 | Morrison et al. |
| 6,533,392 B1 | 3/2003 | Koitabashi |
| 6,636,249 B1 | 10/2003 | Rekimoto |
| 6,674,993 B1 | 1/2004 | Tarbouriech |
| 6,856,965 B1 | 2/2005 | Stinson et al. |
| 6,925,196 B2 | 8/2005 | Kass et al. |
| 6,928,165 B1 | 8/2005 | Takai |
| 6,996,263 B2 | 2/2006 | Jones et al. |
| 7,016,532 B2 | 3/2006 | Boncyk et al. |
| 7,062,454 B1 | 6/2006 | Giannini et al. |
| 7,110,964 B2 | 9/2006 | Tengler et al. |
| 7,154,529 B2 | 12/2006 | Hoke et al. |
| 7,155,228 B2 | 12/2006 | Rappaport et al. |
| 7,162,438 B1 | 1/2007 | Kelly et al. |
| 7,254,552 B2 * | 8/2007 | Bezos .................. G06Q 30/00 705/26.44 |
| 7,265,779 B2 | 9/2007 | Sato et al. |
| 7,309,015 B2 | 12/2007 | Frantz et al. |
| 7,336,890 B2 | 2/2008 | Lu et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,526,280 B2 | 4/2009 | Jung et al. |
| 7,564,469 B2 | 7/2009 | Cohen |
| 7,565,008 B2 | 7/2009 | Boncyk et al. |
| 7,615,446 B2 | 11/2009 | Kim et al. |
| 7,630,937 B1 | 12/2009 | Mo et al. |
| 7,634,448 B1 | 12/2009 | Ramachandran |
| 7,680,324 B2 | 3/2010 | Boncyk et al. |
| 7,693,585 B2 | 4/2010 | Kalan et al. |
| 7,735,728 B2 | 6/2010 | Wallerstorfer |
| 7,751,805 B2 | 7/2010 | Neven et al. |
| 7,775,437 B2 | 8/2010 | Cohen |
| 7,792,736 B2 | 9/2010 | Wasendorf, Sr. |
| 7,792,738 B2 | 9/2010 | Channell |
| 7,832,632 B2 | 11/2010 | Meek et al. |
| 7,840,031 B2 | 11/2010 | Albertson et al. |
| 7,873,710 B2 | 1/2011 | Kiley et al. |
| 7,881,243 B2 | 2/2011 | Hardy et al. |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 7,912,785 B1 | 3/2011 | Kay |
| 7,962,128 B2 | 6/2011 | Neven et al. |
| 7,970,649 B2 | 6/2011 | Wu |
| 7,983,971 B1 | 7/2011 | McLuckie et al. |
| 7,988,060 B2 | 8/2011 | Killian et al. |
| 8,049,621 B1 | 11/2011 | Egan |
| 8,121,944 B2 | 2/2012 | Norman et al. |
| 8,138,930 B1 | 3/2012 | Heath |
| 8,144,944 B2 | 3/2012 | Ishii |
| 8,145,594 B2 | 3/2012 | Geisner et al. |
| 8,149,113 B2 | 4/2012 | Diem |
| 8,154,428 B2 | 4/2012 | Do et al. |
| 8,156,115 B1 | 4/2012 | Erol et al. |
| 8,180,377 B2 | 5/2012 | Yang et al. |
| 8,184,893 B2 | 5/2012 | Calman |
| 8,189,855 B2 | 5/2012 | Opalach et al. |
| 8,190,732 B1 | 5/2012 | Cooley et al. |
| 8,233,673 B2 | 7/2012 | Britz et al. |
| 8,290,237 B1 | 10/2012 | Burks et al. |
| 8,301,501 B1 | 10/2012 | Glaeser et al. |
| 8,315,423 B1 | 11/2012 | Jing et al. |
| 8,364,015 B2 | 1/2013 | Russ et al. |
| 8,385,950 B1 | 2/2013 | Wagner et al. |
| 8,385,971 B2 | 2/2013 | Rhoads et al. |
| 8,392,450 B2 | 3/2013 | Blanchflower et al. |
| 8,438,091 B1 | 5/2013 | Berman |
| 8,438,110 B2 | 5/2013 | Calman et al. |
| 8,483,484 B2 | 7/2013 | Boncyk et al. |
| 8,547,401 B2 | 10/2013 | Mallinson et al. |
| 8,571,888 B2 | 10/2013 | Calman et al. |
| 8,582,850 B2 | 11/2013 | Calman et al. |
| 8,610,766 B2 | 12/2013 | Ding et al. |
| 8,668,498 B2 | 3/2014 | Calman et al. |
| 8,698,896 B2 | 4/2014 | Nerayoff et al. |
| 8,718,612 B2 | 5/2014 | Calman et al. |
| 8,721,337 B2 | 5/2014 | Calman et al. |
| 8,758,102 B2 | 6/2014 | Block et al. |
| 8,793,303 B2 | 7/2014 | Speicher et al. |
| 8,843,405 B1 | 9/2014 | Hartman et al. |
| 8,862,762 B1 * | 10/2014 | Motrenko ............... H04L 51/10 709/230 |
| 8,892,987 B2 | 11/2014 | Leebow |
| 2001/0022615 A1 | 9/2001 | Fernandez et al. |
| 2001/0049653 A1 | 12/2001 | Sheets |
| 2002/0006602 A1 | 1/2002 | Masters |
| 2002/0016739 A1 | 2/2002 | Ogasawara |
| 2002/0029386 A1 | 3/2002 | Robbins |
| 2002/0091607 A1 | 7/2002 | Sloan et al. |
| 2002/0124188 A1 | 9/2002 | Sherman et al. |
| 2002/0133468 A1 | 9/2002 | Mertens |
| 2003/0031358 A1 | 2/2003 | Truxa et al. |
| 2003/0063292 A1 | 4/2003 | Mostafavi |
| 2003/0064705 A1 | 4/2003 | Desiderio |
| 2003/0081934 A1 | 5/2003 | Kirmuss |
| 2003/0081935 A1 | 5/2003 | Kirmuss |
| 2003/0095688 A1 | 5/2003 | Kirmuss |
| 2004/0015983 A1 | 1/2004 | Lemmons |
| 2004/0021584 A1 | 2/2004 | Hartz, Jr. et al. |
| 2004/0024709 A1 | 2/2004 | Yu et al. |
| 2004/0068751 A1 | 4/2004 | Basawapatna et al. |
| 2004/0088228 A1 | 5/2004 | Mercer et al. |
| 2004/0170392 A1 | 9/2004 | Lu et al. |
| 2004/0172285 A1 | 9/2004 | Gibson |
| 2004/0208372 A1 | 10/2004 | Boncyk et al. |
| 2004/0229611 A1 | 11/2004 | Chun |
| 2004/0243468 A1 | 12/2004 | Cohagan et al. |
| 2005/0018216 A1 | 1/2005 | Barsness et al. |
| 2005/0020359 A1 | 1/2005 | Ackley et al. |
| 2005/0052549 A1 | 3/2005 | Schinner et al. |
| 2005/0131585 A1 | 6/2005 | Luskin et al. |
| 2005/0137958 A1 | 6/2005 | Huber et al. |
| 2005/0162523 A1 | 7/2005 | Darrell et al. |
| 2005/0201510 A1 | 9/2005 | Mostafavi |
| 2005/0246457 A1 | 11/2005 | Parry et al. |
| 2005/0261987 A1 | 11/2005 | Bezos et al. |
| 2006/0002607 A1 | 1/2006 | Boncyk et al. |

(56) References Cited

U.S. PATENT DOCUMENTS

| | | |
|---|---|---|
| 2006/0100897 A1 | 5/2006 | Halloran, Jr. et al. |
| 2006/0100951 A1 | 5/2006 | Mylet et al. |
| 2006/0161390 A1 | 7/2006 | Namaky et al. |
| 2006/0176516 A1 | 8/2006 | Rothschild |
| 2006/0218097 A1 | 9/2006 | Walker et al. |
| 2006/0227998 A1 | 10/2006 | Hobgood et al. |
| 2006/0229936 A1 | 10/2006 | Cahill |
| 2006/0229981 A1 | 10/2006 | Crites |
| 2006/0240862 A1 | 10/2006 | Neven et al. |
| 2006/0253329 A1 | 11/2006 | Haines et al. |
| 2007/0088746 A1 | 4/2007 | Baker |
| 2007/0096886 A1 | 5/2007 | Lich et al. |
| 2007/0116299 A1 | 5/2007 | Vanderwall et al. |
| 2007/0140595 A1 | 6/2007 | Taylor et al. |
| 2007/0142091 A1 | 6/2007 | Gasborro et al. |
| 2007/0159522 A1 | 7/2007 | Neven |
| 2007/0162942 A1 | 7/2007 | Hamynen et al. |
| 2007/0162971 A1 | 7/2007 | Blom et al. |
| 2007/0185795 A1 | 8/2007 | Petrime et al. |
| 2007/0240186 A1 | 10/2007 | Silver et al. |
| 2007/0241183 A1 | 10/2007 | Brown et al. |
| 2007/0260486 A1 | 11/2007 | Urich et al. |
| 2007/0279521 A1 | 12/2007 | Cohen |
| 2007/0294721 A1 | 12/2007 | Haeuser et al. |
| 2007/0294738 A1 | 12/2007 | Kuo et al. |
| 2008/0030580 A1 | 2/2008 | Kashiwa et al. |
| 2008/0040278 A1 | 2/2008 | DeWitt |
| 2008/0070198 A1 | 3/2008 | Dempsey |
| 2008/0070546 A1 | 3/2008 | Lee |
| 2008/0077882 A1 | 3/2008 | Kramer et al. |
| 2008/0120639 A1 | 5/2008 | Walter et al. |
| 2008/0148320 A1 | 6/2008 | Howcroft |
| 2008/0183678 A1 | 7/2008 | Weston et al. |
| 2008/0183819 A1* | 7/2008 | Gould .................. G06Q 10/10 709/205 |
| 2008/0192048 A1 | 8/2008 | Nabais Nobre |
| 2008/0195460 A1 | 8/2008 | Varghese |
| 2008/0210753 A1 | 9/2008 | Plozay et al. |
| 2008/0214210 A1 | 9/2008 | Rasanen et al. |
| 2008/0223918 A1 | 9/2008 | Williams et al. |
| 2008/0230603 A1 | 9/2008 | Stawar et al. |
| 2008/0243721 A1 | 10/2008 | Joao |
| 2008/0252723 A1 | 10/2008 | Park |
| 2008/0267447 A1 | 10/2008 | Kelusky et al. |
| 2008/0268876 A1 | 10/2008 | Gelfand et al. |
| 2008/0272914 A1 | 11/2008 | Murray et al. |
| 2008/0307307 A1 | 12/2008 | Ciudad et al. |
| 2009/0005010 A1 | 1/2009 | Dote et al. |
| 2009/0006191 A1 | 1/2009 | Arankalle et al. |
| 2009/0017930 A1 | 1/2009 | Burnett et al. |
| 2009/0055205 A1 | 2/2009 | Nguyen et al. |
| 2009/0061949 A1 | 3/2009 | Chen |
| 2009/0070228 A1 | 3/2009 | Ronen |
| 2009/0089131 A1 | 4/2009 | Moukas et al. |
| 2009/0094125 A1 | 4/2009 | Killian et al. |
| 2009/0102859 A1 | 4/2009 | Athsani et al. |
| 2009/0106317 A1 | 4/2009 | Letendre-Hedlund |
| 2009/0112744 A1 | 4/2009 | Park et al. |
| 2009/0121271 A1 | 5/2009 | Son et al. |
| 2009/0140839 A1 | 6/2009 | Bishop et al. |
| 2009/0144164 A1 | 6/2009 | Wane et al. |
| 2009/0162746 A1 | 6/2009 | Honda |
| 2009/0171650 A1 | 7/2009 | Norman |
| 2009/0171778 A1 | 7/2009 | Powell |
| 2009/0171850 A1 | 7/2009 | Yuval |
| 2009/0181640 A1 | 7/2009 | Jones |
| 2009/0182748 A1 | 7/2009 | Walker |
| 2009/0185241 A1 | 7/2009 | Nepomniachtchi |
| 2009/0202114 A1 | 8/2009 | Morin et al. |
| 2009/0204511 A1 | 8/2009 | Tsang |
| 2009/0237546 A1 | 9/2009 | Bloebaum et al. |
| 2009/0250515 A1 | 10/2009 | Todd et al. |
| 2009/0251963 A1 | 10/2009 | Seol et al. |
| 2009/0254440 A1 | 10/2009 | Pharris |
| 2009/0254467 A1 | 10/2009 | Camp, Jr. |
| 2009/0285444 A1 | 11/2009 | Erol et al. |
| 2009/0287587 A1* | 11/2009 | Bloebaum ............. G01S 5/0205 705/26.8 |
| 2009/0299857 A1 | 12/2009 | Brubaker |
| 2009/0322671 A1 | 12/2009 | Scott et al. |
| 2010/0002204 A1 | 1/2010 | Jung et al. |
| 2010/0034468 A1 | 2/2010 | Boncyk et al. |
| 2010/0060739 A1 | 3/2010 | Salazar |
| 2010/0070365 A1 | 3/2010 | Siotia et al. |
| 2010/0100253 A1 | 4/2010 | Fausak et al. |
| 2010/0103241 A1 | 4/2010 | Linaker |
| 2010/0130226 A1 | 5/2010 | Arrasvuori et al. |
| 2010/0138037 A1 | 6/2010 | Adelberg et al. |
| 2010/0169336 A1 | 7/2010 | Eckhoff-Hornback et al. |
| 2010/0185529 A1 | 7/2010 | Chesnut et al. |
| 2010/0217651 A1 | 8/2010 | Crabtree et al. |
| 2010/0223165 A1 | 9/2010 | Calman et al. |
| 2010/0228558 A1 | 9/2010 | Corcoran et al. |
| 2010/0228776 A1 | 9/2010 | Melkote et al. |
| 2010/0250581 A1 | 9/2010 | Chau |
| 2010/0255795 A1 | 10/2010 | Rubinsky et al. |
| 2010/0257448 A1 | 10/2010 | Squires |
| 2010/0260373 A1 | 10/2010 | Neven et al. |
| 2010/0268629 A1 | 10/2010 | Ross et al. |
| 2010/0277412 A1 | 11/2010 | Pryor |
| 2010/0281432 A1 | 11/2010 | Geisner et al. |
| 2010/0283630 A1 | 11/2010 | Alonso |
| 2010/0302361 A1 | 12/2010 | Yoneyama et al. |
| 2010/0306712 A1 | 12/2010 | Snook et al. |
| 2010/0306715 A1 | 12/2010 | Geisner et al. |
| 2010/0309225 A1 | 12/2010 | Gray et al. |
| 2011/0022540 A1 | 1/2011 | Stern et al. |
| 2011/0034176 A1 | 2/2011 | Lord et al. |
| 2011/0077046 A1 | 3/2011 | Durand et al. |
| 2011/0079639 A1 | 4/2011 | Khan |
| 2011/0081952 A1 | 4/2011 | Song et al. |
| 2011/0091092 A1 | 4/2011 | Nepomniachtchi et al. |
| 2011/0098029 A1 | 4/2011 | Rhoads et al. |
| 2011/0106622 A1 | 5/2011 | Kuhlman et al. |
| 2011/0106845 A1 | 5/2011 | Lipson et al. |
| 2011/0113343 A1 | 5/2011 | Trauth |
| 2011/0119155 A1 | 5/2011 | Hammad et al. |
| 2011/0145093 A1 | 6/2011 | Paradise et al. |
| 2011/0153341 A1 | 6/2011 | Diaz-Cortes |
| 2011/0153402 A1 | 6/2011 | Craig |
| 2011/0157357 A1 | 6/2011 | Weisensale et al. |
| 2011/0164163 A1 | 7/2011 | Bilbrey et al. |
| 2011/0183732 A1 | 7/2011 | Block et al. |
| 2011/0191372 A1 | 8/2011 | Kaushansky et al. |
| 2011/0202460 A1 | 8/2011 | Buer et al. |
| 2011/0202466 A1 | 8/2011 | Carter |
| 2011/0252311 A1 | 10/2011 | Kay et al. |
| 2011/0258121 A1 | 10/2011 | Kauniskangas et al. |
| 2011/0280450 A1 | 11/2011 | Nepomniachtchi et al. |
| 2011/0282821 A1 | 11/2011 | Levy et al. |
| 2011/0317008 A1 | 12/2011 | Sam |
| 2011/0318717 A1 | 12/2011 | Adamowicz |
| 2012/0013770 A1 | 1/2012 | Stafford et al. |
| 2012/0066026 A1 | 3/2012 | Dusig et al. |
| 2012/0075450 A1 | 3/2012 | Ding et al. |
| 2012/0095853 A1 | 4/2012 | von Bose et al. |
| 2012/0098977 A1 | 4/2012 | Striemer et al. |
| 2012/0099756 A1 | 4/2012 | Sherman et al. |
| 2012/0100915 A1 | 4/2012 | Margalit et al. |
| 2012/0140068 A1 | 6/2012 | Monroe et al. |
| 2012/0179609 A1 | 7/2012 | Agarwal et al. |
| 2012/0179665 A1 | 7/2012 | Baarman et al. |
| 2012/0190455 A1 | 7/2012 | Briggs |
| 2012/0229624 A1 | 9/2012 | Calman et al. |
| 2012/0229625 A1 | 9/2012 | Calman et al. |
| 2012/0229629 A1 | 9/2012 | Blumstein-Koren et al. |
| 2012/0229647 A1 | 9/2012 | Calman et al. |
| 2012/0229657 A1 | 9/2012 | Calman et al. |
| 2012/0230538 A1 | 9/2012 | Calman et al. |
| 2012/0230539 A1 | 9/2012 | Calman et al. |
| 2012/0230540 A1 | 9/2012 | Calman et al. |
| 2012/0230548 A1 | 9/2012 | Calman et al. |
| 2012/0230557 A1 | 9/2012 | Calman et al. |
| 2012/0230577 A1 | 9/2012 | Calman et al. |

(56) References Cited

U.S. PATENT DOCUMENTS

| | | |
|---|---|---|
| 2012/0231424 A1 | 9/2012 | Calman et al. |
| 2012/0231425 A1 | 9/2012 | Calman et al. |
| 2012/0231814 A1 | 9/2012 | Calman et al. |
| 2012/0231840 A1 | 9/2012 | Calman et al. |
| 2012/0232937 A1 | 9/2012 | Calman et al. |
| 2012/0232954 A1 | 9/2012 | Calman et al. |
| 2012/0232966 A1 | 9/2012 | Calman et al. |
| 2012/0232968 A1 | 9/2012 | Calman et al. |
| 2012/0232976 A1 | 9/2012 | Calman et al. |
| 2012/0232977 A1 | 9/2012 | Calman et al. |
| 2012/0232993 A1 | 9/2012 | Calman et al. |
| 2012/0233003 A1 | 9/2012 | Calman et al. |
| 2012/0233015 A1 | 9/2012 | Calman et al. |
| 2012/0233025 A1 | 9/2012 | Calman et al. |
| 2012/0233032 A1 | 9/2012 | Calman et al. |
| 2012/0233033 A1 | 9/2012 | Calman et al. |
| 2012/0233070 A1 | 9/2012 | Calman et al. |
| 2012/0233072 A1 | 9/2012 | Calman et al. |
| 2012/0233089 A1 | 9/2012 | Calman et al. |
| 2012/0265679 A1 | 10/2012 | Calman et al. |
| 2012/0265809 A1 | 10/2012 | Hanson et al. |
| 2012/0287278 A1 | 11/2012 | Danis |
| 2012/0299961 A1 | 11/2012 | Ramkumar et al. |
| 2012/0313781 A1 | 12/2012 | Barker et al. |
| 2012/0320248 A1 | 12/2012 | Igarashi |
| 2012/0330753 A1 | 12/2012 | Urbanski et al. |
| 2013/0011111 A1 | 1/2013 | Abraham et al. |
| 2013/0031202 A1 | 1/2013 | Mick et al. |
| 2013/0033522 A1 | 2/2013 | Calman et al. |
| 2013/0036050 A1 | 2/2013 | Giordano et al. |
| 2013/0046589 A1 | 2/2013 | Grigg et al. |
| 2013/0046602 A1 | 2/2013 | Grigg et al. |
| 2013/0046603 A1 | 2/2013 | Grigg et al. |
| 2013/0054367 A1 | 2/2013 | Grigg et al. |
| 2013/0103608 A1 | 4/2013 | Scipioni et al. |
| 2013/0114877 A1 | 5/2013 | Meek et al. |
| 2013/0116855 A1 | 5/2013 | Nielsen et al. |
| 2013/0155474 A1 | 6/2013 | Roach et al. |
| 2013/0156317 A1 | 6/2013 | Calman |
| 2013/0182010 A2 | 7/2013 | Schoeller et al. |
| 2013/0259313 A1 | 10/2013 | Breed et al. |
| 2014/0006259 A1 | 1/2014 | Grigg et al. |
| 2014/0098993 A1 | 4/2014 | Boncyk et al. |
| 2014/0219566 A1 | 8/2014 | Rodriguez et al. |

OTHER PUBLICATIONS

Brody, A B (1999), Pocket BargainFinder: A handheld Device for Augmented Commerce, Handheld and Ubiquitous computing, First International Symposium, HUC'99 Karlsruhe, Germany, Sep. 27-29, 1999 Proceedings, pp. 14-51. Retrieved from https://search.proquest.com/professional/docview/729929360/briefcitation/1510901369b4c70b903/3?accountid=142257.

PCT International Preliminary Report on Parentability (IPRP) for International Application No. PCT/US2012/048697 Dated Feb. 4, 2014.

PCT International Search Report and Written Opinion for International Application No. PCT/US 12/28008 dated May 22, 2012.

PCT International Search Report and Written Opinion for International Application No. PCT/US 12/28036 dated May 28, 2012.

PCT International Search Report and Written Opinion for International Application No. PCT/US2012/027912 dated Jun. 8, 2012.

PCT International Search Report and Written Opinion for International Application No. PCT/US 12/27892 dated Jun. 14, 2012.

M.J Welch (2010). Addressing the Challenges in Underspecification in Web Search. (order No. 3446833, University of California, Los Angeles). ProQuest Dissertations and Theses; 137; retrieved from http://search.proquest.com/docview/8581010500?accountid=14753 (858101500).

K.J. Jeevan & P. Padhi (2006). A Selective Review of Research in Content Personalization. Library Review, 55(9), 556-586. doi:http://dx.doi.org/10.1108/00242503610706761.

P.A.Lessner (2007). Chi-thinking: Chiasmus and Cognition. (Order No. 3297307, University of Maryland, College Park). ProQuest Dissertations and Theses; 487; retrieved from http://search.proquest.com/docview/304851937?accountid=14753. (304851937).

International Preliminary Examination Report for International Application No. PCT/US12/27892 dated Sep. 10, 2013; 9 pages.

International Preliminary Examination Report for International Application No. PCT/US2012/027890 dated Sep. 10, 2013; 6 pages.

International Preliminary Examination Report for International Application No. PCT/US2012/28036 dated Sep. 10, 2013; 5 pages.

International Preliminary Examination Report for International Application No. PCT/US12/28008 dated Sep. 10, 2013; 7 pages.

International Preliminary Examination Report for International Application No. PCT/US12/27912 dated Sep. 10, 2013; 6 pages.

International Search Report and Written Opinion dated Oct. 12, 2012 for International Application No. PCT/US1248697.

International Search Report and Written Opinion for International Publication No. PCT/Us12/27890 mailed Feb. 5, 2013.

Hollmer, M. (Mar. 18, 2004) MIT kicks off annual $50K business plan competition_The Boston Business Journal, 24, 24. Retrieved from http://search.proquest.com/docview/216355359?accountid=14753.

Jayne O'Donnell and Christine Dugas. More retailers go for green—the eco kind; Home Depot tags friendly products: [Final Edition]. USA Today [McLean, Va] Apr. 18, 2007: B.3.

* cited by examiner

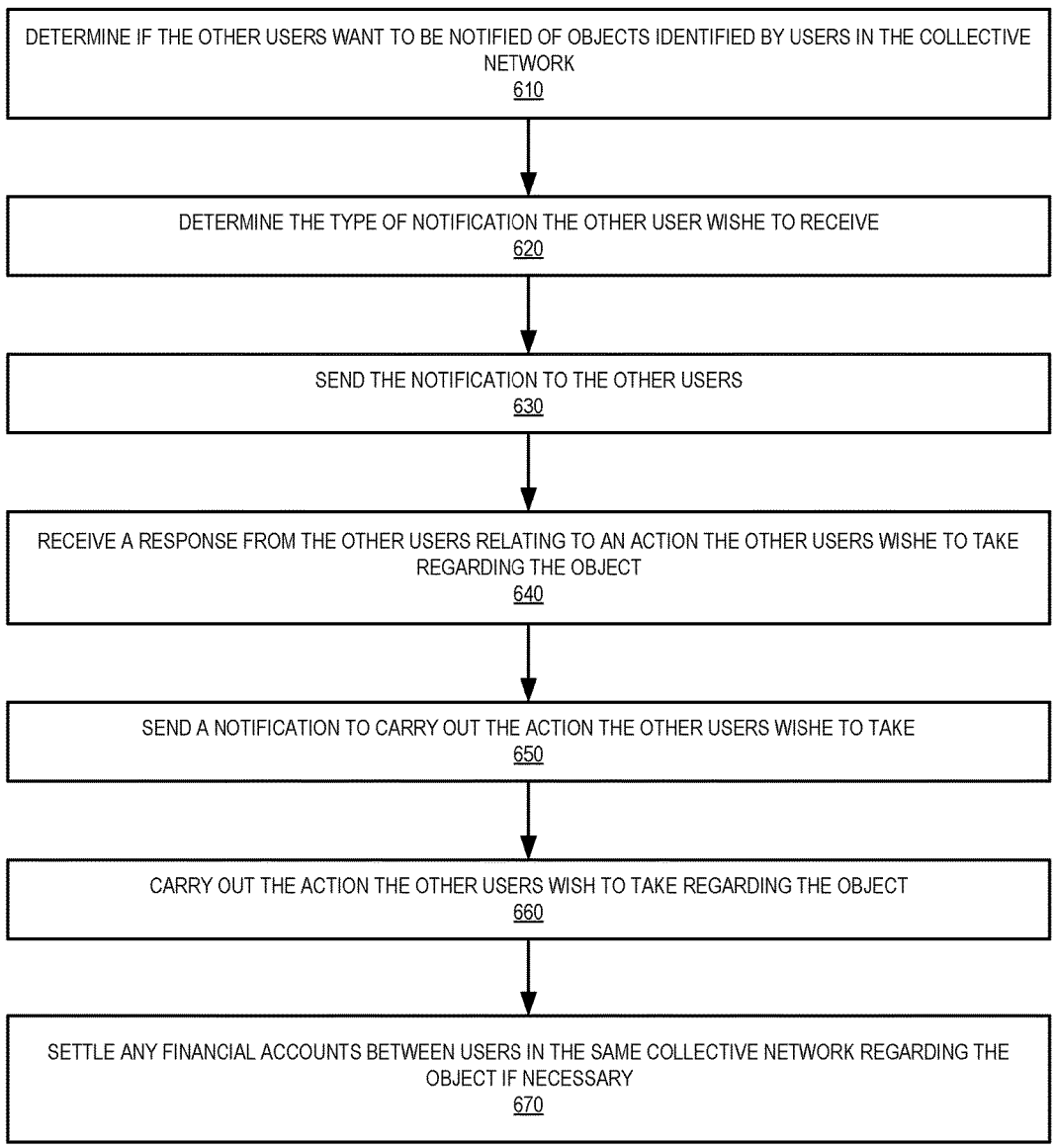

SYSTEM FOR COLLECTIVE NETWORK OF AUGMENTED REALITY USERS

CROSS-REFERENCE TO RELATED APPLICATIONS

This application is a continuation of U.S. patent application Ser. No. 13/342,059, filed Jan. 1, 2012, which in turn claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,417, filed Apr. 22, 2011, entitled "Collective Network of Augmented Reality Users", the entirety of which are both incorporated herein by reference.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have additional features that are becoming increasingly more common and standardized. Such features include, but are not limited to, location-determining devices, such as Global Positioning System (GPS) devices; sensor devices, such as accelerometers; and high-resolution video cameras.

As the hardware capabilities of such mobile devices have increased, so too have the applications (i.e., software) that rely on the hardware advances. One such example of innovative software is a category known as augmented reality (AR), or more generally referred to as mediated reality. One such example of an AR application platform is Layar, available from Layar, Amsterdam, the Netherlands.

The Layar platform technology analyzes location data, compass direction data, and the like in combination with information related to the objects, locations or the like in the video stream to create browse-able "hot-spots" or "tags" that are superimposed on the mobile device display, resulting in an experience described as "reality browsing".

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Generally, methods, apparatus systems and computer program products are described herein that provide for using real-time video analysis, such as AR or the like to assist the user or a group of users to utilize mobile devices for creating a collective network environment of users that identifies objects in which one or more users in a group of users is interested, and notifies one or more users of information associated with the object. A collective network comprises a group of users that each have a mobile device that contains or is otherwise coupled to a data capture device. For example, the mobile device may be a mobile phone that is capable of taking video with a camera device. A user in the collective network may capture real-time video on his mobile device utilizing an image capture device, and during the data capture, or at a time thereafter, AR analysis is performed on the video or stills in the video to identify the object in the video.

Real-time vision object recognition analysis is used to identify objects, such as but not limited to logos, artwork, products, locations, buildings, writing, barcodes, good or service ("products") identifiers, people and other features that were captured in the video stream and thereafter match the objects to data associated with each. The data about the objects can be used to identify the other users in the collective network who might be interested in receiving information, such as product information, pricing information, location information, etc. about the same or similar object as the object captured in the video. Therefore, any user identified in the collective network that might be interested in the same or similar object may receive a notification about the object. The notification may tell the user where to get the object or it may allow the user to purchase the object. The financial accounts of the users in the collective network may be linked in such a way that the first user capturing the object, or the second user receiving the notification of the object, may purchase the object immediately or at a later point in time with the first user's funds, the second user's funds, on credit from the financial institution, etc. Thereafter, the transaction can be settled between the accounts of the first user, second user, financial institution, and/or merchant.

In specific embodiments, the data that is used to match objects captured from a first user to a second user is, at least in part, specific to financial institutions, such as customer financial behavior history, customer purchase power/transaction history and the like. In this regard, many of the embodiments herein disclosed leverage financial institution data that is specific to a financial institution of the users when providing information to the users in connection with real-time video stream captured by a user and the associated video analysis.

Embodiments of the present invention assist the one or more users in one or more collective networks to identify more objects using data capture devices and AR analysis, and associate data to the objects in which the one or more users are interested over a wider range than that which a single user could indentify on his own.

Embodiments of the invention comprise a method, system, or computer program product for receiving data about a first object, wherein the data about the first object is recognized through the use of a first data capture device operatively coupled to a first mobile device of a first user; determining if a second user within one or more collective networks of users is interested in a second object based on the data about the first object, wherein a collective network of users is a group of one or more users that have the ability to recognize data about objects through the use of data capture devices operatively coupled to mobile devices of the users; and presenting a notification about the second object to a second mobile device of the second user when it is determined that the second user is interested in the second object.

In further accord with embodiments of the invention, determining if the second user within the collective network of users is interested in the object further comprises determining the first user from which the data about the object was received.

In another embodiment of the invention, determining if the second user within the collective network of users is interested in the object further comprises determining the one or more collective networks to which the first user belongs.

In yet another embodiment of the invention, determining if the second user within the collective network of users is interested in the object further comprises determining the one or more users that belong to the one or more collective networks.

In still another embodiment of the invention, determining if the second user within the collective network of users is interested in the object further comprises comparing the data received about the first object to a group of one or more objects associated with the one or more users that belong to the one or more collective networks.

In further accord with embodiments of the invention, the group of one or more objects associated with the one or more users is a wish list, shopping list, or object transaction history associated with the one or more users.

In another embodiment of the invention, the first object and the second object are the same.

In yet another embodiment of the invention, the second object is similar to or related to the first object.

In still another embodiment of the invention, the invention further comprises receiving a request from the first user or the second user to create the collective network.

In further accord with embodiments of the invention, the invention further comprises receiving a request from the first user or the second user to create a first user profile or a second user profile for the collective network.

In another embodiment of the invention, the invention further comprises receiving a request to link and authenticate a first user profile or a second user profile to an account of the first user or the second user at a financial institution.

In yet another embodiment of the invention, the invention further comprises receiving a request to link one or more objects to a first user profile or a second user profile.

In still another embodiment of the invention, the invention further comprises receiving a request to invite the one or more users to join the collective network.

In further accord with embodiments of the invention, the invention further comprises receiving a request to allow the one or more users to join the collective network.

In another embodiment of the invention, presenting a notification about the second object to a second mobile device of the second user further comprises determining if the second user wants to be notified of objects identified by the one or more users in the one or more collective networks.

In yet another embodiment of the invention, presenting a notification about the second object to a second mobile device of the second user further comprises determining a type of notification to present to the second user.

In still another embodiment of the invention, the invention further comprises receiving a response from the second user relating to action that the second user wants to take.

In further accord with an embodiment of the invention, the invention further comprises posting and settling the accounts of the first user, the second user, a financial institution, or a merchant after the second user makes a purchase of the first object or the second object.

To the accomplishment the foregoing and the related ends, the one or more embodiments comprise the features hereinafter fully described and particularly pointed out in the claims. The following description and the annexed drawings set forth detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
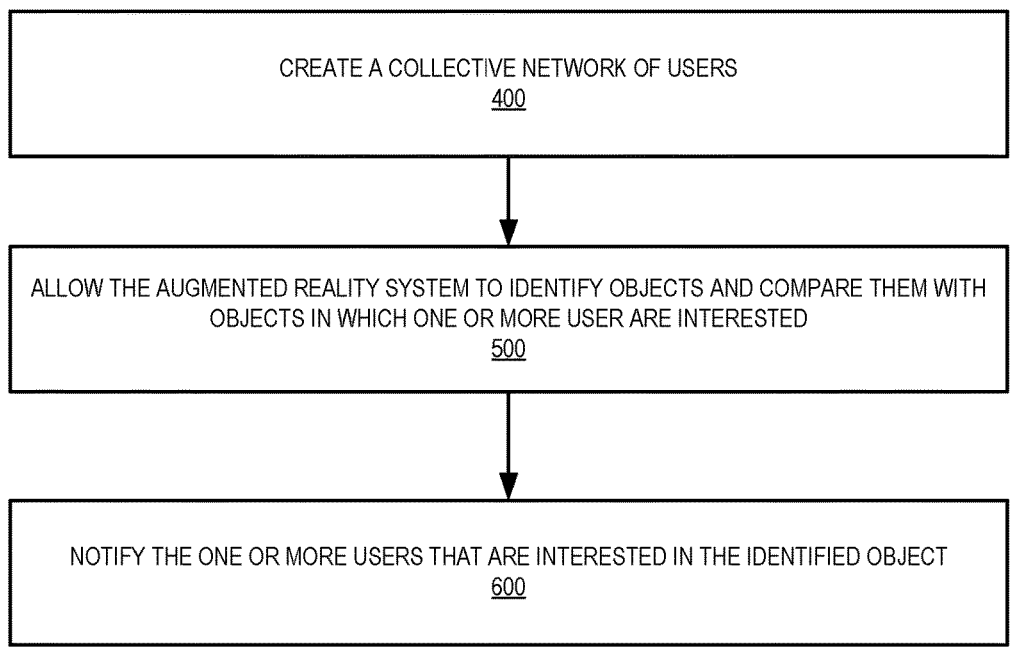
Figure 2:
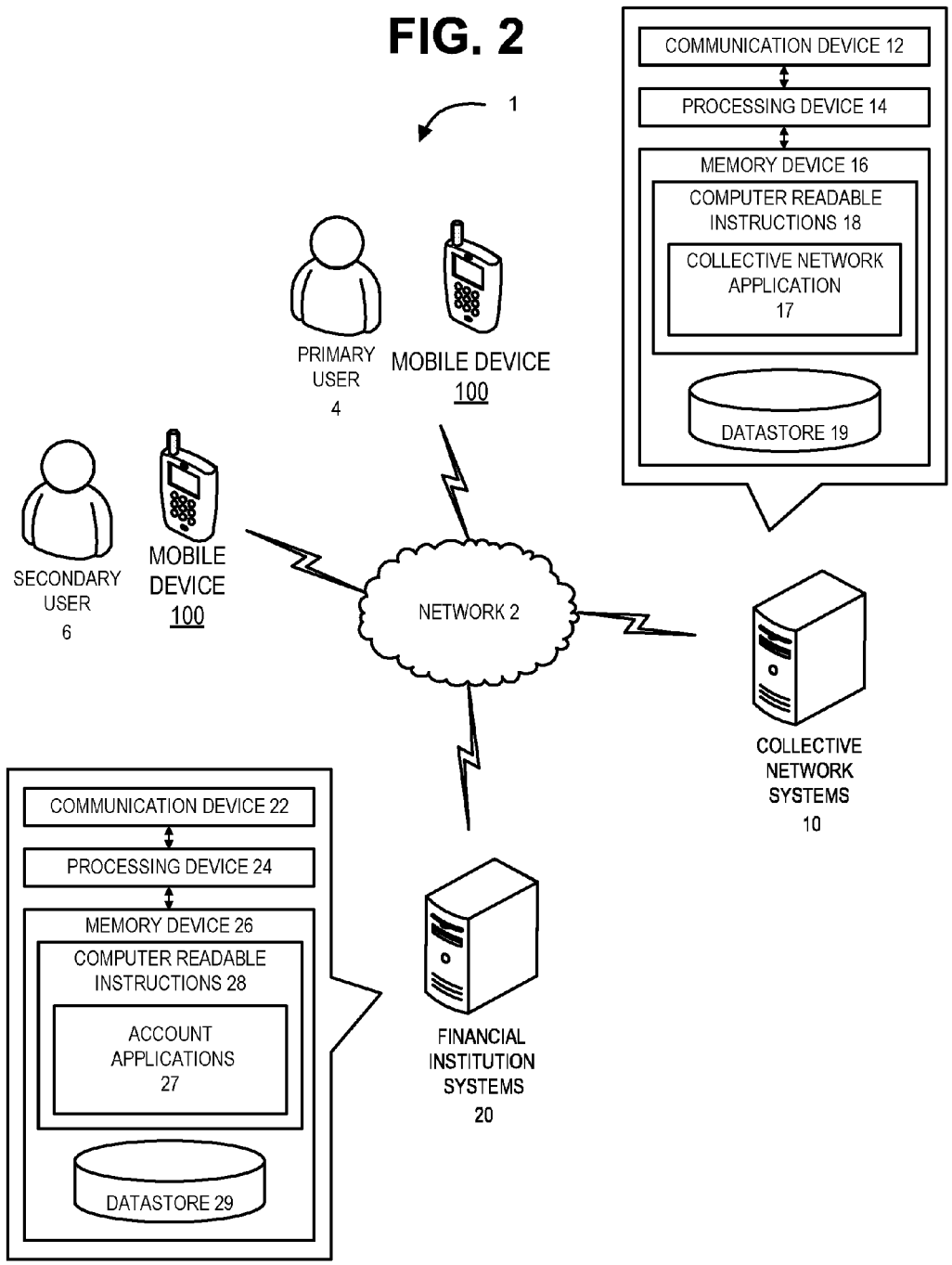
Figure 3:
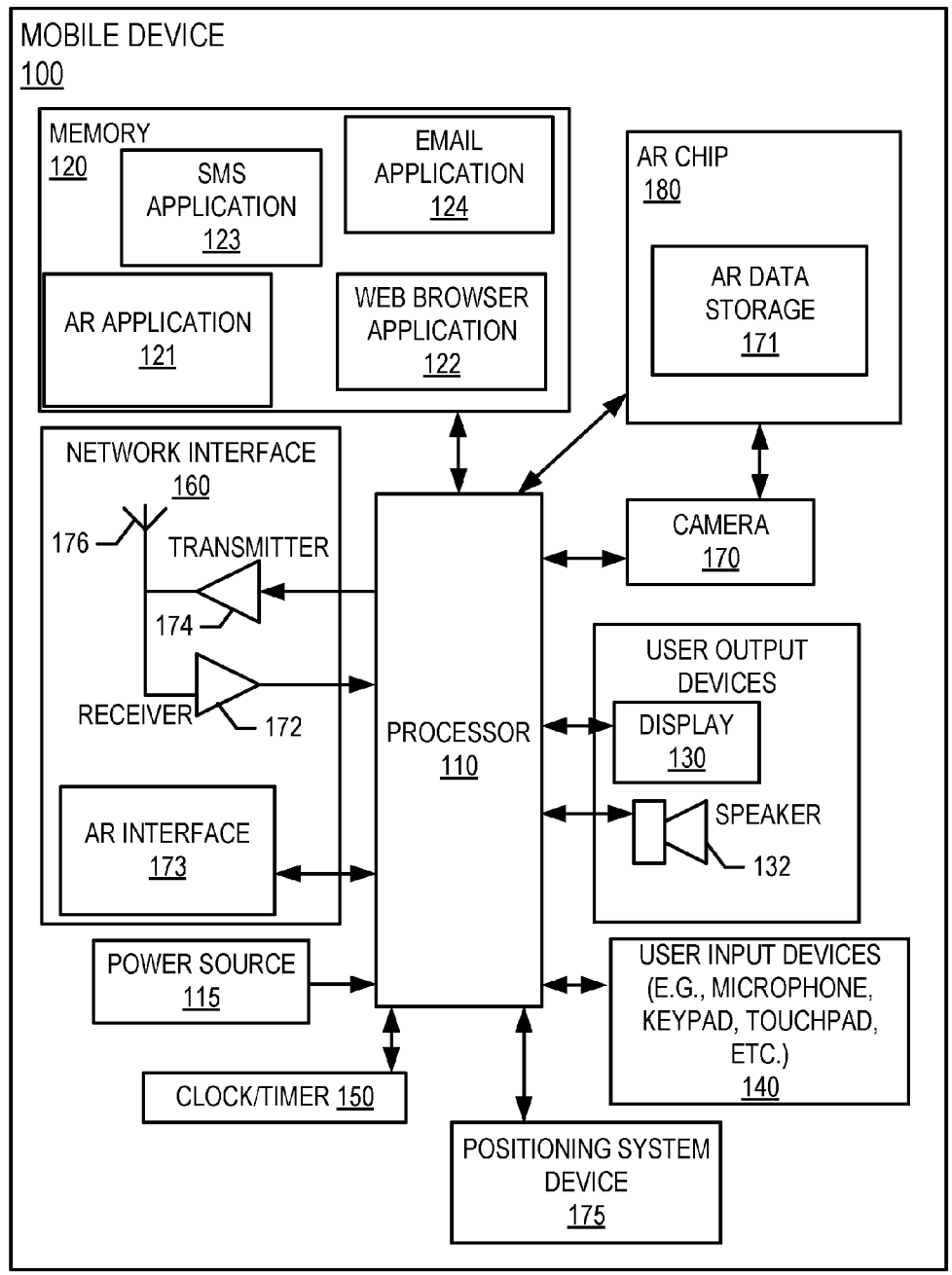
Figure 4:
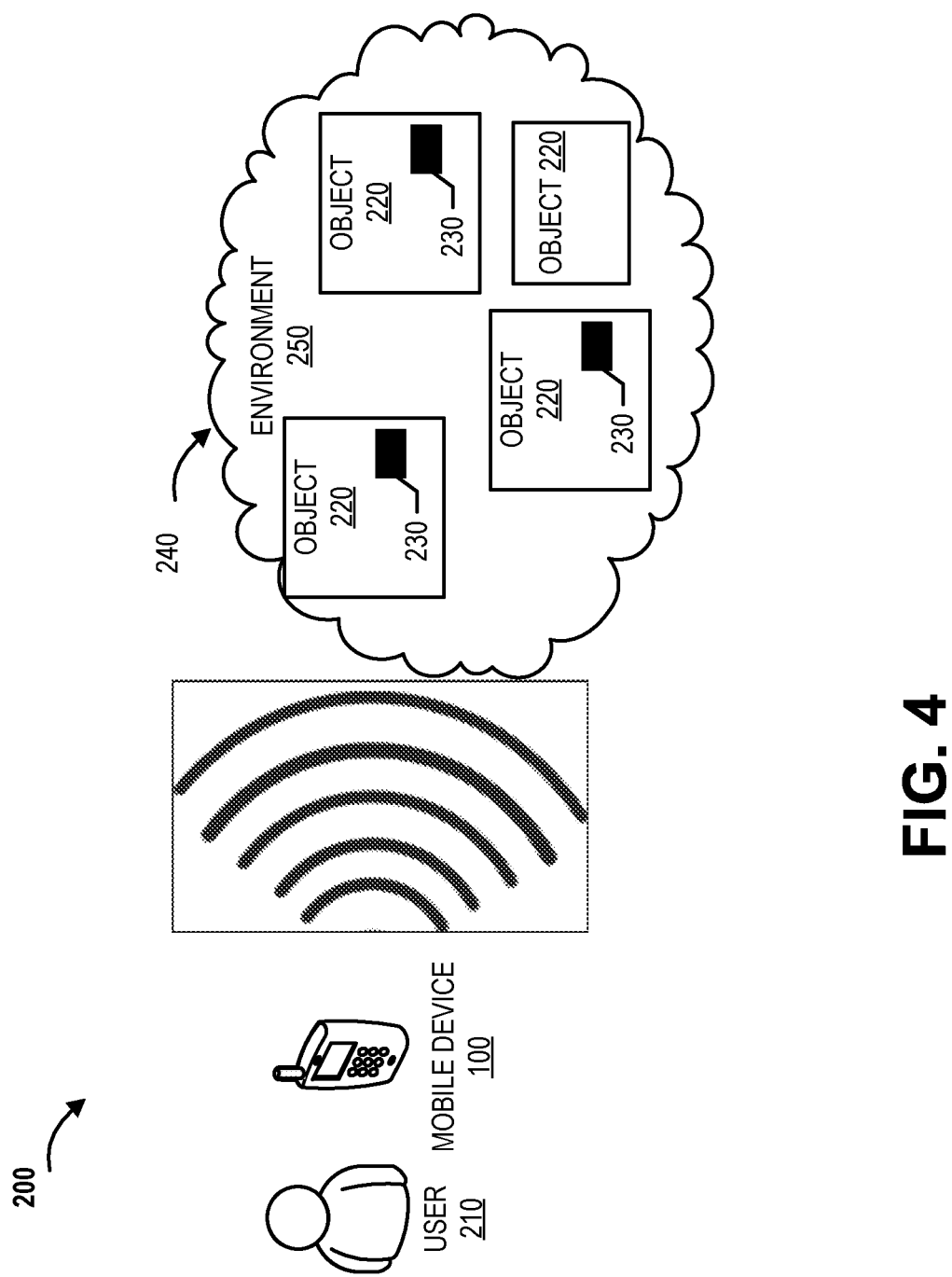
Figure 5:
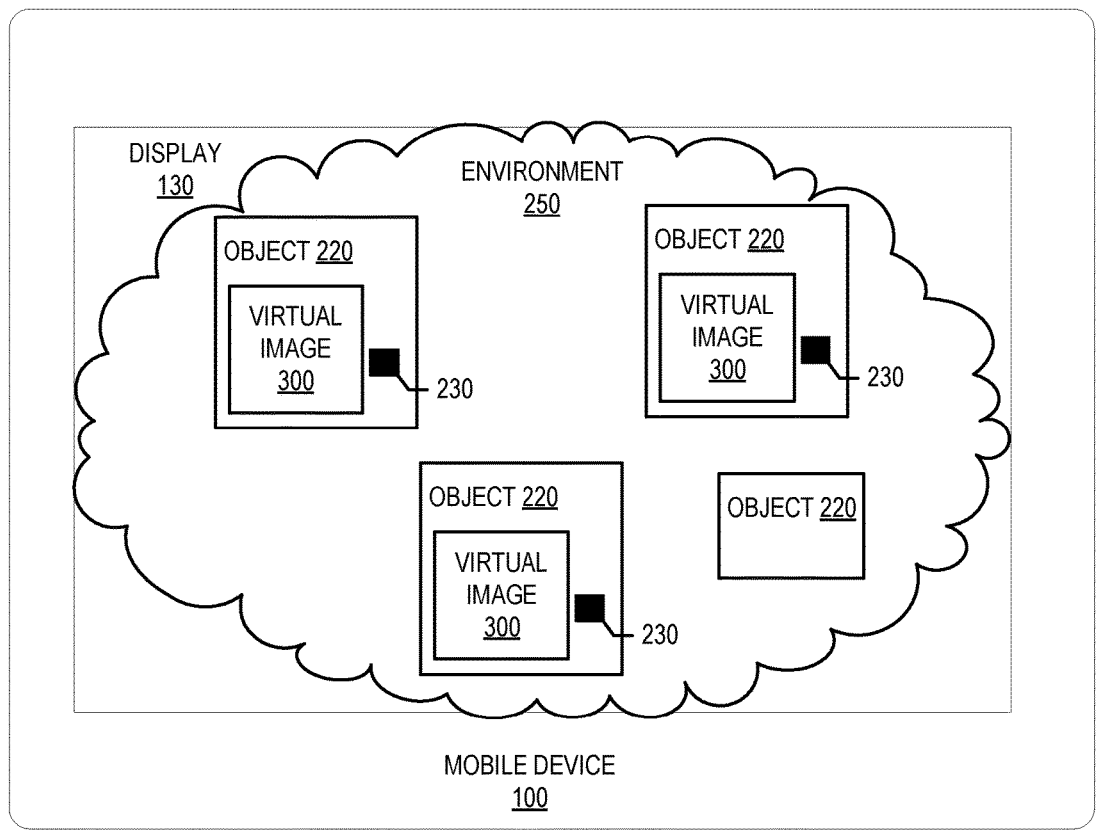
Figure 6:
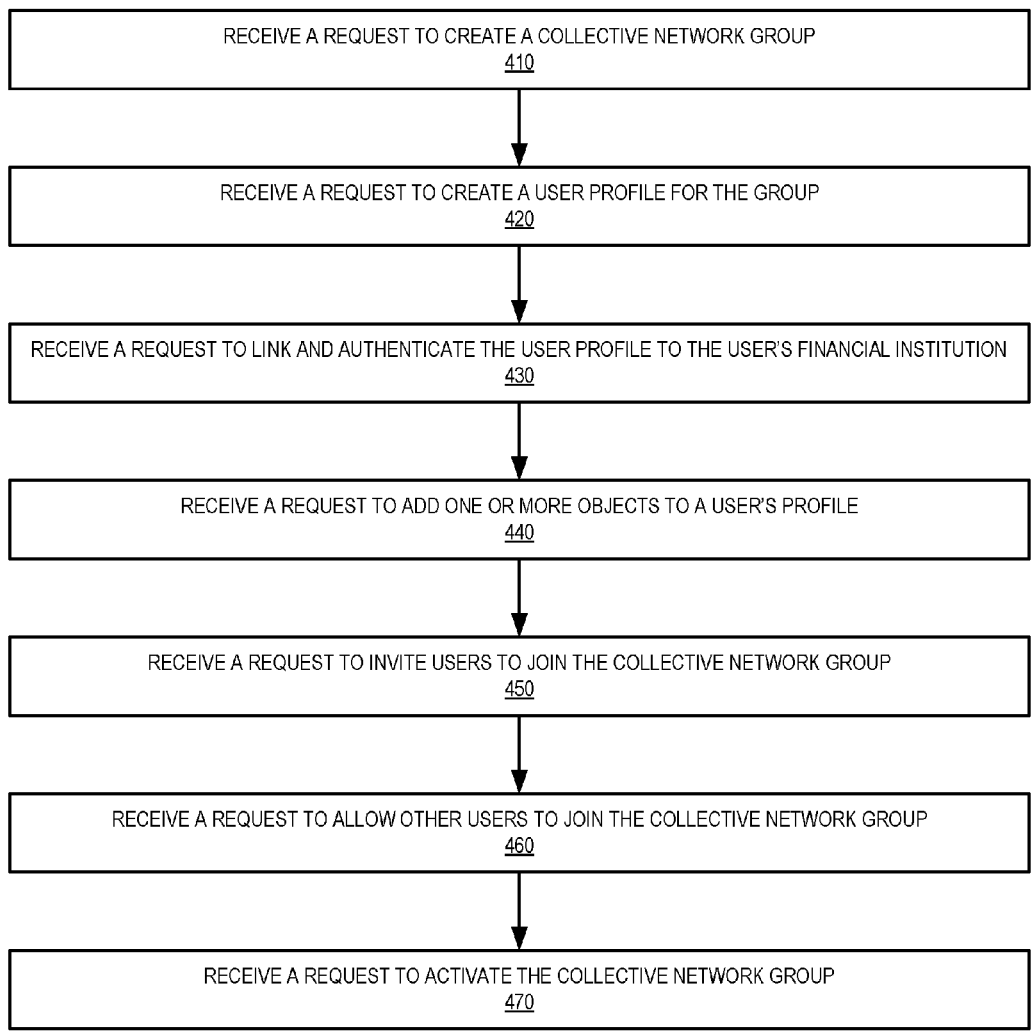
Figure 7:
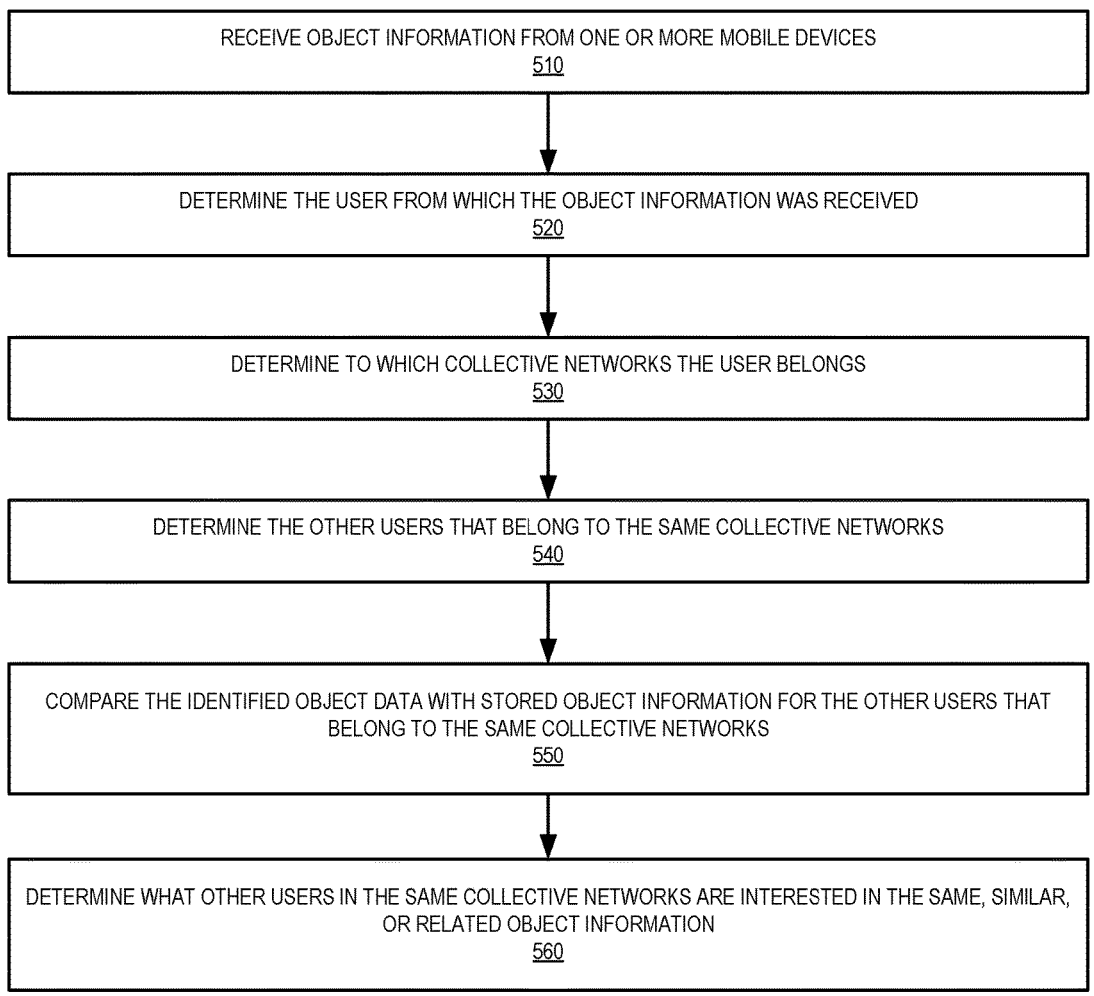

Having thus described embodiments of the invention in general terms, reference will now be made to the accompanying drawings, which are not necessarily drawn to scale, and wherein:

FIG. 1 is a high level process flow illustrating a collective network process, in accordance with one embodiment of the invention;

FIG. 2 is a block diagram illustrating a collective network AR environment, in accordance with an embodiment of the invention FIG. 3 is a block diagram illustrating a mobile device, in accordance with an embodiment of the invention;

FIG. 4 is a block diagram illustrating a mobile device capturing objects, in accordance with an embodiment of the invention;

FIG. 5 is a block diagram illustrating a mobile device display, in accordance with an embodiment of the invention FIG. 6 is a process flow illustrating a collective network creation process, in accordance with an embodiment of the invention;

FIG. 7 is a process flow illustrating a collective network utilization process, in accordance with an embodiment of the invention; and FIG. 8 is a process flow illustrating a collective network notification process, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Thus, methods, systems, computer programs and the like are herein disclosed that provide for creating a collective network, capture images using an image capture device, using real-time video analysis, such as AR or the like, to assist the user of mobile devices within the collective network to receive notifications of objects in which the user might be interested based on the real-time video of other users in the collective network. Through the use of real-time vision object recognition, objects such as but not limited to, logos, artwork, products, locations, buildings, writing, barcodes, product identifiers, and other features that can be recognized in the real-time video stream and can be matched to data associated with the object to assist the user with receiving information about the objects in which the user is interested.

In specific embodiments, the data that is matched to the images in the real-time video stream is specific to financial institutions, such as customer financial behavior history, customer purchase power/transaction history and the like ("financial institution data"). In this regard, many of the embodiments herein disclose leveraging financial institution data, which is uniquely specific to a financial institution, in providing object information to the mobile devices of the users in connection with real-time video stream analysis. For example, the financial institution data may be used to determine the objects in which a user in a collective network may be interested, discounts associated with an object, what accounts to use for payment methods, etc.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

FIG. 1 illustrates a high level process flow for a collective network process 90, in accordance with one embodiment of the invention. As illustrated by block 400 the first step in the process is to create a collective network of users. In various embodiments of the invention this process step may include, but is not limited to, creating one or more collective network groups, setting up a user profile for the user in the group, linking and authenticating the user profile in the collective network to the user's financial accounts, adding one or more objects to the user profile indicating the object in which the user is interested, requesting to add one or more other users to the collective network, accepting one or more users into the collective network, and activating the collective network.

As illustrated by block 500 in FIG. 1, another step in the collective network process 90 is to capture an object using the object recognition application, such as an image capture device or the like, through a mobile device 100 and compare information about the object with the objects in which one or more users in the same collective networks have an interest. This step may include receiving object information from one or more mobile devices, determining the user from which the object information was sent, determining to which collective networks the user belongs, determining the other users that belong to the same collective networks, comparing the identified object information with the objects in which the other users in the collective networks have an interest, and determining the other users in the collective network that are interested in the same, similar, or related objects to the object identified.

As illustrated by block 600 in FIG. 1, the last step in the collective network process 90 is to notify one or more users in the collective network that another user in the collective network has captured information about an object in which the one or more users are interested. This step may include but is not limited to determining if a user wants to be notified of objects identified by other users in collective network in which the user has an interest, determining the type of notification the user wishes to receive, sending the notification to the user which may be sent via a social networking site, receiving a response from the user relating to the action that the user wishes to take regarding the object (i.e. purchase the object, hold the object for later, purchase the object somewhere else, etc.), sending a notification to carry out the action, performing the action, and, if necessary, settling the financial accounts of the users, merchant, and financial institution. This step may be executed by the user, by a software agent, an algorithm, other systems, and/or the like.

FIG. 2 illustrates a collective network system environment 1, in accordance with an embodiment of the present invention. As illustrated in FIG. 2, the mobile devices 100 are operatively coupled, via a network 2 to other mobile devices 100 of one or more users (i.e. the primary user 4, secondary user 6, and/or other users), the collective network system 10, and the financial institution systems 20. In this way a user can set up a collective network system that allows a group of users within a collective network to capture information with the mobile devices 100, utilize the collective network systems 10 to identify object information in which a user in the collective network would be interested, and notify the user when an object in which the user is interested is identified.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

In some embodiments of the invention the primary user 4 is any user that belongs to the collective network who captures an object using the mobile device 100 and the secondary user 6 is any user in the collective network for whom it is determined that the user may be interested in receiving information about the object. As explained throughout this specification the determination of the secondary user's interest in object information may be based on a group of products (i.e. wish list, shopping list, etc.), transaction history, selected interests, etc. selected by or attributed to the secondary user 6. In other embodiments of the invention the primary user 4 is a user that the secondary user 6 designates as a person from which the secondary user 6 wants to receive object information from based on the objects captured by the primary user 4. In other embodiments, the secondary user 6 can be assigned to a primary user 4, or visa versa, based on the profiles of the users, interests, transaction history, etc. Therefore the users in the collective network can select specific people in the network to follow, select specific objects to follow, be assigned to specific people, or be assigned to specific objects in order to receive information about objects captured by the other users in the collective network. Also, for example a dependent user 4 can also be a secondary user 4 at the same time or at a later point in time in the configuration network. For example, the dependent user 4 may be capturing an object which is being sent to a secondary user 6 within the collective network, while at the same time the dependent user 4 may also be receiving object information from another user at the same time, in which case the dependent user 4 is also a secondary user 6.

As illustrated in FIG. 2, the mobile devices, as explained in further detail below with respect to FIG. 3 generally comprise a communication device, a processing device, and a memory device. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device is operatively coupled to the communication device and the memory device. The processing device uses the communication device to communicate with the network 2 and other devices on the network 2, such as, but not limited to, the other mobile devices 100, the collective network systems 10, and/or financial institution systems 20. As such, the communication device generally comprises a modem, server, or other device for communicating with other devices on the network 2. As further illustrated in FIG. 3, the mobile device 100 may have computer-readable instructions stored in the memory device, which in one embodiment includes the computer-readable instructions of an object recognition application 121. In some embodiments, the memory device includes a datastore for storing data related to the mobile device, including but not limited to data created and/or used by the object recognition application 121. Again these systems, devices, and applications will be explained in further detail with respect to FIG. 3, however, they are generally used for capturing objects using an object identification device, such as an image capture device 170 or the like to capture real-time video or the like.

As illustrated in FIG. 2, the collective network systems 10 generally comprise a communication device 12, a processing device 14, and a memory device 16. The processing device 14 is operatively coupled to the communication device 12 and the memory device 16. The processing device 14 uses the communication device 12 to communicate with the network 2 and other devices on the network 2, such as, but not limited to, the mobile devices 100 and/or the financial institution systems 20. As such, the communication device 12 generally comprises a modem, server, or other device for communicating with other devices on the network 2.

As further illustrated in FIG. 2, the collective network systems 10 comprise computer-readable instructions 18 stored in the memory device 16, which in one embodiment includes the computer-readable instructions 18 of a collective network application 17. In some embodiments, the memory device 16 includes a datastore 19 for storing data related to the collective network systems 10, including but not limited to data created and/or used by the collective network application 17.

The collective network application 17 is an application that is used to receive, process, store, and send information relating to objects captured by the mobile devices 100, determine if information related to the objects captured should be sent to other users in the collective network, and send notifications to the mobile devices 100 of users regarding the objects captured if it is determined users in the collective network are interested in the objects. The collective network application 17 may also communicate with account applications 27 at the financial institution to process transactions made by users through the collective network.

As further illustrated in FIG. 2, the financial institution systems 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the mobile devices 100 and the collective network systems 10. As such, the communication device 22 generally comprises a modem, server, wireless card, and/or other device(s) for communicating with other devices on the network 2.

As further illustrated in FIG. 2, the financial institution systems 20 comprise computer-readable instructions 28 stored in the memory device 26, which in one embodiment includes the computer-readable instructions 28 of an account application 27. In some embodiments, the memory device 26 includes a datastore 29 for storing data related to the financial institution systems 20, including but not limited to data created and/or used by the account application 27.

The account application 27 allows the users to connect their individual user profiles in the collective network to their accounts at the financial institution. In this way the users within the collective network can purchase objects identified by them or other users in the collective network after the collective network systems send notifications to users about objects in which the users may be interested.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 3 illustrates an embodiment of a mobile device 100 that may be configured to execute object recognition and Augmented Reality (AR) functionality, in accordance with specific embodiments of the present invention. A "mobile device" 100 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, tablet computers, cameras, video recorders, audio/video player, radio, GPS devices, any combination of the aforementioned, or the like.

The mobile device 100 may generally include a processor 110 communicably coupled to such devices as a memory 120, user output devices 136, user input devices 140, a network interface 160, a power source 115, a clock or other timer 150, an image capture device 170, a positioning system device 175 (e.g., a Global Positioning System (GPS) device), one or more integrated circuits 180, etc.

In some embodiments, the mobile device 100 and/or the server access one or more databases or datastores (not shown in FIG. 3) to search for and/or retrieve information related to an object and/or marker. In some embodiments, the mobile device 100 and/or the server access one or more datastores local to the mobile device 100 and/or server and in other embodiments, the mobile device 100 and/or server access datastores remote to the mobile device and/or server. In some embodiments, the mobile device 100 and/or server access both a memory and/or datastore local to the mobile device 100 and/or server as well as a datastore remote from the mobile device and/or server.

The processor 110, and other processors described herein, may generally include circuitry for implementing communication and/or logic functions of the mobile device 100. For example, the processor 110 may include a digital signal processor device, a microprocessor device, and various analog to digital converters, digital to analog converters, and/or other support circuits. Control and signal processing functions of the mobile device 100 may be allocated between these devices according to their respective capabilities. The processor 110 thus may also include the functionality to encode and interleave messages and data prior to modulation and transmission. The processor 110 may additionally include an internal data modem. Further, the processor 110 may include functionality to operate one or more software programs or applications, which may be stored in the memory 120. For example, the processor 110 may be capable of operating a connectivity program, such as a web browser application 122. The web browser application 122 may then allow the mobile device 100 to transmit and receive web content, such as, for example, location-based content and/or other web page content, according to a Wireless Application Protocol (WAP), Hypertext Transfer Protocol (HTTP), and/or the like.

The processor 110 may also be capable of operating applications, such as an object recognition application 121. The object recognition application 121, or a portion of thereof, may be downloaded from a server and stored in the memory 120 of the mobile device 100. Alternatively, the object recognition application 121 may be pre-installed and stored in a memory in the integrated circuit 180. In such an embodiment, the user may not need to download the object recognition application 121 from a server. In some embodiments the object recognition application 121 may be stored on a server and the mobile device 100 can access the object recognition application 121, such as through the network 2, in order to access the functionality of the object recognition application 121. The object recognition application 121 may be used in conjunction with an object capture device, such as an image capture device 170 to capture images of objects. The objection recognition application 121 may work in conjunction with or contain an AR presentation application 125. The AR presentation application 125 may be downloaded, pre-installed, stored, or accessed in the same way as described with respect to the object recognition application 121. The AR presentation application 125 may be used to analyze the objects captured and display them with indicators 300, as explained in further detail later.

In some embodiments, the processor 110 may also be capable of operating one or more applications, such as one or more applications functioning as an artificial intelligence ("AI") engine. The processor 110 may recognize objects that it has identified in prior uses by way of the AI engine. In this way, the processor 110 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The integrated circuit 180 may include the necessary circuitry to provide the object recognition functionality to the mobile device 100. Generally, the integrated circuit 180 may include data storage 171 which may include data associated with the objects within a real-time video stream that the object recognition application 121 identifies as having a certain object recognition marker(s). The integrated circuit 180 and/or data storage 171 may be an integrated circuit, a microprocessor, a system-on-a-chip, a microcontroller, or the like. As discussed above, in one embodiment, the Integrated circuit 180 may provide the object recognition functionality to the mobile device 100. In some embodiments, some or all of the data storage 171 for the data associated with objects may be located outside of the mobile device 100, such as on another computer or sever, with which the mobile device 100 can communicate to access and/or store data associated with objects captured.

Of note, while FIG. 3 illustrates the integrated circuit 180 as a separate and distinct element within the mobile device 100, it will be apparent to those skilled in the art that the object recognition functionality of the integrated circuit 180 may be incorporated within other elements in the mobile device 100. For instance, the functionality of the Integrated circuit 180 may be incorporated within the mobile device memory 120 and/or processor 110. In a particular embodiment, the functionality of the integrated circuit 180 is incorporated in an element within the mobile device 100 that provides object recognition capabilities to the mobile device 100. Still further, the Integrated circuit 180 functionality may be included in a removable storage device such as an SD card or the like.

The processor 110 may be configured to use the network interface 160 to communicate with one or more other devices on a network. In this regard, the network interface 160 may include an antenna 176 operatively coupled to a transmitter 174 and a receiver 172 (together a "transceiver"). The processor 110 may be configured to provide signals to and receive signals from the transmitter 174 and receiver 172, respectively. The signals may include signaling information in accordance with the air interface standard of the applicable cellular system of the wireless telephone network that may be part of the network. In this regard, the mobile device 100 may be configured to operate with one or more air interface standards, communication protocols, modulation types, and access types. By way of illustration, the mobile device 100 may be configured to operate in accordance with any of a number of first, second, third, and/or fourth-generation communication protocols, etc. and/or the like. For example, the mobile device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 100 may also be configured to operate in accordance with non-cellular communication mechanisms, such as via a wireless local area network (WLAN) or other communication/data networks.

The network interface 160 may also include an object recognition interface 173 in order to allow a user to execute some or all of the above-described processes with respect to the Object recognition application 121 and/or the Integrated circuit 180. The object recognition interface 173 may have access to the hardware, e.g., the transceiver, and software previously described with respect to the network interface 160. Furthermore, the object recognition interface 173 may have the ability to connect to and communicate with an external object recognition data storage on a separate system within the network as a means of recognizing the object(s) in the video stream.

As described above, the mobile device 100 may have a user interface that includes user output devices 136 and/or user input devices 140. The user output devices 136 may include a display 130 (e.g., a liquid crystal display (LCD) or the like) and a speaker 132 or other audio device, which are operatively coupled to the processor 110. The user input devices 140, which may allow the mobile device 100 to receive data from a user 110, may include any of a number of devices allowing the mobile device 100 to receive data from a user, such as a keypad, keyboard, touch-screen, touchpad, microphone, mouse, joystick, other pointer device, button, soft key, and/or other input device(s).

The mobile device 100 may further include a power source 115. Generally, the power source 115 is a device that supplies electrical energy to an electrical load. In one embodiment, power source 115 may convert a form of energy such as solar energy, chemical energy, mechanical energy, etc. to electrical energy. Generally, the power source 115 in a mobile device 100 may be a battery, such as a lithium battery, a nickel-metal hydride battery, or the like, that is used for powering various circuits, e.g., the transceiver circuit, and other devices that are used to operate the mobile device 100. Alternatively, the power source 115 may be a power adapter that can connect a power supply from a power outlet to the mobile device 100. In such embodiments, a power adapter may be classified as a power source "in" the mobile device.

The mobile device 100 may also include a memory 120 operatively coupled to the processor 110. As used herein, memory may include any computer readable medium configured to store data, code, or other information. The memory 120 may include volatile memory, such as volatile Random Access Memory (RAM) including a cache area for the temporary storage of data. The memory 120 may also include non-volatile memory, which can be embedded and/or may be removable. The non-volatile memory may additionally or alternatively include an electrically erasable programmable read-only memory (EEPROM), flash memory or the like.

The memory 120 may store any of a number of applications or programs which comprise computer-executable instructions/code executed by the processor 110 to implement the functions of the mobile device 100 described herein. For example, the memory 120 may include such applications as an object recognition application 121, a web browser application 122, an Short Message Service (SMS) application 123, an email application 124, an AR presentation application 125, etc. As explained throughout the application, the object recognition application 121, in some embodiments, allows the user of the mobile device to capture objects using the mobile device, identify the objects and retrieve additional information about the object, and the AR presentation application 125 allows indicators to be associated with the objects being captured and displayed.

In some embodiments, the information provided by the real-time video stream may be compared to data provided to the system through an API. In this way, the data may be stored in a separate API and be implemented by request from the mobile device and/or server accesses another application by way of an API.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

FIG. 4 includes a block diagram illustrating an object recognition experience 200 in which a primary user 4 utilizes a mobile device 100 to capture real-time video of an environment 250. As denoted earlier, the mobile device 100 may be any mobile communication device. The mobile device 100 has the capability of capturing real-time video of the surrounding environment 250. The real-time video captured may be by any means known in the art. In one particular embodiment, the mobile device 100 is a mobile telephone equipped with an image capture device 170 capable of video capture.

The environment 250 contains a number of objects 220. Some of such objects 220 may include a marker 230 identifiable to the mobile device 100. A marker 230 may be any type of marker that is a distinguishing feature that can be interpreted by the mobile device 100 to identify specific objects 220. For instance, an object recognition marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 100 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object 220. For instance, the marker 230 may be some type of identifiable feature that is an indication that the object 220 is nearby. In some embodiments, the marker 230 for an object 220 may actually be the marker 230 for a different object 220. For example, the mobile device 100 may recognize a particular building as being "Building A." Data stored in the data storage 125l may indicate that "Building B" is located directly to the east and next to "Building A." Thus, markers 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 100 and associated applications to interpret to a desired confidence level what the object is. For another example, the mobile device 100, object recognition application 121 and/or AR presentation application 125 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be, or include, social network data, such as data retrieved or communicated from the Internet, such as tweets, blog posts, social networking site posts, various types of messages and/or the like. In other embodiments, the marker 230 is provided in addition to social network data as mentioned above. For example, the mobile device 100 may capture a video stream and/or one or more still shots of a large gathering of people. In this example, as above, one or more people dressed as characters in costumes may be present at a specified location. The mobile device 100, object recognition application 121, and/or the AR presentation application 125 may identify several social network indicators, such as posts, blogs, tweets, messages, and/or the like indicating the presence of one or more of the characters at the specified location. In this way, the mobile device 100 and associated applications may communicate information regarding the social media communications to the user and/or use the information regarding the social media communications in conjunction with other methods of object recognition. For example, the mobile device 100 object recognition application 121, and/or the AR presentation application 125 performing recognition of the characters at the specified location may confirm that the characters being identified are in fact the correct characters based on the retrieved social media communications. This example may also be applied objects outside of people.

In some embodiments, the mobile device and/or server access one or more other servers, social media networks, applications and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 4 illustrates that the objects 220 with markers 230 only include a single marker 230, it will be appreciated that the object 220 may have any number of markers 230 with each equally capable of identifying the object 230. Similarly, multiple markers 230 may be identified by the mobile device 100 and associated applications such that the combination of the markers 230 may be utilized to identify the object 230. For example, the mobile device 100 may utilize facial recognition markers 230 to identify a person and/or utilize a separate marker 230, such as the clothes the person is wearing to confirm the identification to the desired confidence level that the person is in fact the person the mobile device identified. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 100 may utilize Global Positioning System (GPS) software to determine the location of the user 210 and/or object 220. As noted above, a location-based marker 230 could be utilized in conjunction with other non-location-based markers 230 identifiable and recognized by the mobile device 100 to identify the object 220. However, in some embodiments, a location-based marker 230 may be the only marker 230. For instance, in such embodiments, the mobile device 100 may utilize GPS software to determine the location of the user 210 and a compass device or software to determine what direction the mobile device 100 is facing in order to identify the object 220. In still further embodiments, the mobile device 100 does not utilize any GPS data in the identification. In such embodiments, markers 230 used to identify the object 220 are not location-based.

FIG. 5 illustrates a mobile device 100 wherein the primary user 4 has executed an object recognition application 121 and an AR presentation application 125 to present within the display 130 indication of recognized objects within the live video stream (i.e., surrounding environment 250). The mobile device 100 is configured to rely on markers 230 to identify objects 220, such as products, businesses, locations, etc. in which the primary user 4 in a collective network is capturing, in order to notify a secondary user 6 information related to the products, businesses, locations, etc. by displaying an indicator 300 (e.g., virtual image) on the mobile device display 130 in conjunction with the display of the live video stream. As illustrated, if an object 220 does not have any markers 230 (or at least enough markers 230 to yield object identification), the object 220 may be displayed without an associated indicator 300.

The mobile device 100 may use any type of means in order to identify desired objects 220 (e.g., object recognition application 121 and image capture device 170, etc.). For instance, the mobile device 100 may utilize one or more pattern recognition algorithms to analyze objects in the environment 250 and compare with markers 230 in data storage 171 which may be contained within the mobile device 100 (such as within Integrated circuit 180) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the mobile device 100 is configured to superimpose an indicator 300 on the mobile device display 130. The indicator 300 is generally a graphical representation that highlights or outlines the object 220 and may be activatable (e.g., include a tab or link), such that the primary user 4 may "select" the indicator 300 and retrieve information related to the identified object. The information may include any desired information associated with the selected object and may range from basic information to greatly detailed information. In some embodiments, the indicator 300 may provide the user 210 with an internet hyperlink to further information on the object 220. The information may include, for example, all types of media, such as text, images, clipart, video clips, movies, or any other type of information desired. In yet other embodiments, the indicator 300 information related to the identified object may be visualized by the user 210 without "selecting" the indicator 300.

In embodiments in which the indicator 300 provides an interactive tab to the primary user 4, the primary user 4 may select the indicator 300 by any conventional means for interaction with the mobile device 100. For instance, in some embodiments, the primary user 4 may utilize an input device 140 such as a keyboard to highlight and select the indicator 300 in order to retrieve the information. In a particular embodiment, the mobile device display 130 includes a touch screen that the primary user 4 may employ to select the indicator 300 utilizing the user's finger, a stylus, or the like.

In some embodiments, the indicator 300 is not interactive and simply provides information to the primary user 4 by superimposing the indicator 300 onto the display 130. For example, in some instances it may be beneficial for the object recognition application 121 to merely identify an object 220, just identify the object's name/title, give brief information about the object, etc., rather than provide extensive detail that requires interaction with the indicator 300. The mobile device 100 and/or AR presentation application 125 is capable of being tailored to a user's desired preferences.

After an object is either selected by the primary user 4, by the object recognition application 121, or the AR presentation application 125 a secondary user 6 may receive notification that the primary user 4 has identified an object in which the secondary user 6 may be interested, as explained in further detail below with respect to FIG. 8.

Furthermore, the indicator 300 may be displayed at any size on the mobile device display 130. The indicator 300 may be small enough that it is positioned on or next to the object 220 being identified such that the object 220 remains discernable behind the indicator 300. Additionally, the indicator 300 may be semi-transparent such that the object 220 remains discernible behind the indicator 300. In other embodiments, the indicator 300 may be large enough to completely cover the object 220 portrayed on the display 130. Indeed, in some embodiments, the indicator 300 may cover a majority or the entirety of the mobile device display 130.

The primary user 4 may opt to execute the object recognition application 121 and AR presentation application 125 at any desired moment and begin video capture and analysis. However, in some embodiments, the object recognition application 121 and/or AR presentation application 125 includes an "always on" feature in which the mobile device 100 is continuously capturing video and analyzing the objects 220 within the video stream. In such embodiments, the object recognition application 121 and/or the AR presentation application 125 may be configured to alert the primary user 4 or secondary user 6 that a particular object 220 has been identified by the primary user 4. The primary user 4 or secondary user 6 may set any number of user preferences to tailor the AR experience 200 to their needs. For instance, the secondary user 6 may opt to only be alerted if a certain particular object 220 is identified. Additionally, it will be appreciated that the "always on" feature in which video is continuously captured may consume the mobile device power source 115 more quickly. Thus, in some embodiments, the "always on" feature may disengage if a determined event occurs such as low power source 115, low levels of light for an extended period of time (e.g., such as if the mobile device 100 is in a user's pocket obstructing a clear view of the environment 250 from the mobile device 100), if the mobile device 100 remains stationary (thus receiving the same video stream) for an extended period of time, the user sets a certain time of day to disengage, etc. Conversely, if the "always on" feature is disengaged due to the occurrence of such an event, the users may opt for the "always on" feature to re-engage after the duration of the disengaging event (e.g., power source 115 is re-charged, light levels are increased, etc.).

In some embodiments, the primary user 4 may identify objects 220 that the object recognition application 121 does not identify and add it to the data storage 171 with desired information in order to be identified and/or displayed in the future. For instance, the primary user 4 may select an unidentified object 220 and enter a name/title and/or any other desired information for the unidentified object 220. In such embodiments, the object recognition application 121 may detect/record certain markers 230 about the object so that the pattern recognition algorithm(s) (or other identification means) may detect the object 220 in the future. Furthermore, in cases where the object information is within the data storage 171, but the object recognition application 121 fails to identify the object 220 (e.g., one or more identifying characteristics or markers 230 of the object has changed since it was added to the data storage 171 or the marker 230 simply was not identified), the primary user 4 may select the object 220 and associate it with an object 220 already stored in the data storage 171. In such cases, the object recognition application 121 may be capable of updating the markers 230 for the object 220 in order to identify the object in future real-time video streams.

In addition, in some embodiments, the primary user 4 may opt to edit the information or add to the information provided by the indicator 300. For instance, the primary user 4 may opt to include user-specific information about a certain object 220 such that the information may be displayed upon a future identification of the object 220. Conversely, in some embodiments, the primary user 4 may opt to delete or hide an object 220 from being identified and a indicator 300 associated therewith being displayed on the mobile device display 130.

Furthermore, in some instances, an object 220 may include one or more markers 230 identified by the object recognition application 121 that leads the object recognition application 121 to associate an object with more than one object in the data storage 171. In such instances, the primary user 4 may be presented with the multiple candidate identifications for the objects 220 and may opt to choose the appropriate identification or input a different identification. The multiple candidates may be presented to the primary user 4 by any means. For instance, in one embodiment, the candidates are presented to the primary user 4 as a list wherein the "strongest" candidate is listed first based on reliability of the identification. Upon input by the user 210 identifying the object 220, the object recognition application 121 may "learn" from the input and store additional markers 230 in order to avoid multiple identification candidates for the same object 220 in future identifications.

Additionally, the object recognition application 121 may utilize other metrics for identification than identification algorithms. For instance, the object recognition application 121 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the primary user 4 may input preferences or other metrics for which the object recognition application 121 may utilize to narrow results of identified objects 220.

In some embodiments, the AR presentation application 125 may have the ability to gather and report user interactions with displayed indicators 300. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

FIG. 6 illustrates a collective network creation process 402, in accordance with one embodiment of the invention as explained with respect to block 400 in FIG. 1. As illustrated in block 410, the collective network systems 10 receive a request to create a collective network group. In some embodiments of the invention this may comprise of a user downloading an application or part of an application, such as a collective network application 17 or an application that allows a user to access the collective network application 17 on the mobile device 100. In other embodiments the collective network application 17 may be a part of or can communicate with a part of the object recognition application 121 and/or AP presentation application 125 stored on the mobile device 100 or other server. In creating a collective network group the user may select a "create new collective network group" feature displayed in the interface of the mobile device 100 through the use of the collective network application 17. In other embodiments of the invention the user may ask to join a collective network that is already established. In yet other embodiments of the invention a user may dynamically create a collective network group. This may be provided by software agents, algorithms, or the like, able to communicate with one another on behalf of a user. There may be more than one collective network with one or more users (i.e. multiple dependent users 4 and multiple secondary users 6) in each collective network within the collective network system environment 1. After receiving a request to create a collective network group the collective network application 17 may set up a new collective network. For example, in one embodiment of the invention a primary user 4 may want to set up a collective network of his friends related to identifying video game systems, video games, or other video game accessories in which the group of friends may be interested. However, the collective network does not need to be limited to a type of product. The collective network may be comprise of a group of user who have similar interests, live in the same neighborhood, shop at the same stores, like to watch similar movies, interested in the same architecture on buildings, are interested when new stores open, etc. and want to be notified when these types of events occur.

As illustrated by block 420 in FIG. 6, the collective network may also receive a request from a user to create a user profile for the group. The user profile may include information about the user, for example, the location of the user's home, work, places the user likes to visit, etc. The user profile can include personal information about the locations the user frequents the financial accounts of the user, user news or event reporting (i.e. news or events that the user would like others to view, such as an accident, disaster, retirement announcement, etc.), the objects in which the user may be interested. For example, as illustrated by block 430, the collective network may receive a request to link and authenticate the user profile in the collective network to an account the user holds at a financial institution. In this way the collective network application 17 can communicate with the account applications 27 on the financial institution systems 20 to gain access to the financial accounts of the user or the access to the bank that holds the financial account of the user. Thus, the users can make purchases using the mobile devices 100 linked to the users' accounts and/or settle accounts between users in the collective network by contacting the financial institutions of the users in the collective network. In some embodiments the users may be able to fund accounts that are tracked and stored by the collective network application 17 such that financial transactions can be made without having to contact the financial institution. In other embodiments the collective network application can access the financial accounts of the user to determine the user's transaction history in order to determine what types of purchases the user likes to make. In yet other embodiments, the collective network application 17 can be linked to an individual associated with the user, such that the user and individual associated with the user may communicate. Individuals associated with the user may include, but are not limited to a financial advisor for advisement on purchases, etc. or a friend for personal advice on making a purchase.

As illustrated by block 440, the collective network may receive a request to add one or more objects to the user's profile. For example, a secondary user 6 may want to be notified when a primary user 4 in the collective network identifies a product, business, location, etc. in which the secondary user 6 is interested. In this way the secondary user 6 can add the object to a group of objects in the secondary user's profile, such as in a wish list, shopping list, etc. Therefore, when the objects in the secondary user's profile are identified by a primary user 6 in the same collective network then the collective network application 17 can notify the secondary user 6 that the object has been identified. In some embodiments the user requests to have an object added to the user's profile, however, in other embodiments the collective network application 17 suggests or automatically adds a product to the user's list. For example, in the present application users within a collective network may request to have a specific video game console added to their user profiles so they may be notified when another user in the collective network identifies the video game console.

As illustrated in block 450 of FIG. 6, the collective network application 17 may receive a request to invite users to the join the collective network group. For example, in some embodiments the user who set up the collective network or users designated to invite other users may be able to invite other people to join the collective network. In other embodiments of the invention, any user in the collective network may be able to invite other people to become users of the collective network.

Block 460 in FIG. 6, illustrates that the collective network application may receive a request from people not currently in the collective network to join the collective network. For example, a collective network may include a group of friends from college, and other people at the school may want to join the college collective network to receive information related to objects that other people from the college are identifying with the object recognition application 121. Therefore, people may request that the primary user 4, secondary user 6, or the collective network application 17 allow them to become users of the collective network.

As illustrated in block 470, the collective network may receive a request to activate the collective network group. In some embodiments of the invention the user that set up the collective network, or other users in the collective network, may need to activate the collective network by turning on the object recognition application 121 and the AR presentation application, and allowing the collective network application 17 to receive object information from the object recognition application 121 that is being captured by the mobile device 100 of the user.

FIG. 7 illustrates a collective network utilization process 502, in accordance with one embodiment of the invention as explained with respect to block 500 in FIG. 1. As illustrated by block 510 in FIG. 7, the collective network application 17 receives object information from one or more mobile devices 100. After the object recognition application 121 is activated the mobile device 100 may capture information about objects as previously explained. The information about the objects captured by the mobile device 100 is pushed to, or pulled by, the collective network application 17 or some other application (e.g., part of the object recognition application 121) that communicates with the collective network application 17 located on a server outside of the mobile device 100. Again these process steps can be performed by one or more applications that communicate with the mobile device 100 and/or each other. The collective network application 17 (or the AR presentation application 125) analyzes the information about the object in order to determine the object captured by the mobile device 100. The application may determine what the object is and as illustrated by block 520 in FIG. 7 the application determines the user that captured the object information. For example, with respect to the example discussed herein, the primary user 4 may be located in an electronics store and the object recognition application 121 on the mobile device 100 of the primary user 4 may capture object information about a video game system sold at the electronics store. The mobile device may capture information about the object by, for example, taking video of the system, scanning a barcode, capturing written data, etc. Thereafter, the object recognition application 121 may determine what video game system the electronics store has in stock and the price of the video game system, and send that information to the collective network application 17. In other embodiments, information from the video may be received by the collective network application 17, which then determines information related to the video game system captured in the video and the identity of the primary user 4.

Thereafter, as illustrated by block 530 the collective network application 17 determines to which collective networks the primary user 4 belongs. For example, the primary user 4 may belong to two separate collective networks with one or more users in each network. The collective network application 17 may determine what secondary users 6 also belong to the same collective networks as the primary user 4, as illustrated by block 540 in FIG. 7. For example, there might be ten secondary users 6 in the first collective network and twenty secondary users 6 in the second collective network.

As illustrated by block 550 in FIG. 7, the collective network application 17 compares the identified object data captured by the primary user 4 with stored object information for the for users that belong to the same collective networks. For example, the collective network application 17 may compare the information about the new video game system captured by the primary user 4 with the ten secondary users 6 that belong to the first collective network and the twenty secondary users 6 that belong to the second collective network. The collective network application 17 determines what users in the same collective networks as the primary user 4 are interested in the same, similar, or related object information, as illustrated in block 560 of FIG. 7. In the example discussed herein, two of the users 6 in the first collective network may have the video game system associated with the their profiles and one secondary user 6 in the second collective network may have video games for the video game system associated with his profile. Therefore, in this example there are two users in the first collective network that the collective network application 17 identified as being interested in the same object and one user in the second collective network that is interested in a related product.

FIG. 8 illustrates a collective network notification process 602, in accordance with one embodiment of the invention as explained with respect to block 600 in FIG. 1. As illustrated in block 610 of FIG. 8, the collective network application 17 determines if the secondary users 6 want to be notified of objects identified by the dependent user 4. For example, in the example described herein, all three of the secondary users 6 identified in the first collective network and the second collective network want to be notified. As illustrated by block 620, the collective network application 17 determines the type of notification that the identified secondary users 6 wish to receive. The users can be notified by text message, e-mail, telephone call, video link, alarm notification, application message, or other like means. In our example, one of the secondary users 6 in the first collective network requested to receive a text message regarding any identified objects. The other secondary user 6 requested to receive a message and video link of the product taken by the mobile device 100 and associated applications. Finally, the identified secondary user 6 from the second collective network may wish to be notified by e-mail.

As illustrated by block 630 once the type of notification is received the collective network application 17 sends the notifications to the identified secondary users 6. In some embodiments, the notification is sent to users over the traditional communication channels for a mobile device or computer (i.e. text message, e-mail). In some embodiments the users may be notified through the collective network application 17 that has it own log-in and authentication process. Therefore, in some embodiments the collective network application 17 allows for secure financial transactions to take place between the users and/or a financial institution hosting the collective network application 17. In one example, the collective network application 17 may be a part of an online-banking application at a financial institution, such that the user can make purchases using their accounts though the online banking application.

In some embodiments, the collective application network 17 may receive a response from the secondary user 6 relating to an action the secondary user 6 wishes to take regarding the object, as illustrated in block 640 of FIG. 8. As illustrated by block 650 the collection notification application 17 may receive a response from the secondary user 6 relating to an action that the secondary user 6 wishes to take regarding the object. In some embodiments the secondary user 6 may want to purchase the object on site, purchase the object over the Internet, identify locations to purchase the object, receive more information regarding the object, have the primary user 4 purchase the object (i.e. using the primary user's funds, using funds from the secondary user 6, or on credit from the financial institution or merchant), etc. For example, in the example described herein, one secondary user 6 in the first collective network may have the primary user 4 purchase the video game system for him, while the other secondary user 4 in the first collective network may request to be shown locations near him that are selling the same video system, and the secondary user 6 in the second collective network may request to receive more information regarding video games that can be purchased that relate to the video game system identified.

As illustrated by block 650, the collective network application 17 may send a notification to carry out the action that the secondary user 6 wishes to take. For example, the collective network application 17 may send a notification to the primary user 4 to purchase the object for the secondary user 6, it may send a notification to purchase the object with the funds of a secondary user 6, it may send a notification to the primary user 4 to capture more information about the object or other related objects, etc. In the example described herein the collective network application 17 may send a notification to the primary user 4 to purchase the video game system for the secondary user 6 in the first collective network. The financial institution may transfer funds from the account of the secondary user 6 to the account of the primary user 4 in order to make the purchase. In other embodiments of the invention the purchase may be made directly from the account from the second user 6, through authorization based on the second user 6 being virtually present via the collective network.

The collective network application 17 may also send a notification to the primary user 4 to capture the video games that are being sold with the game for the secondary user 6 in the second collective network. In some embodiments the step illustrated in block 650 is not necessary as the collective network application 17 may already have additional information requested by the secondary user 6, in which case the process can move to the next step. For example, the collective network application 17 may already have information about the location of the same video game system for the second secondary user 6 in the first collective network that requested information about the other locations selling the same video game system.

As illustrated in block 660 of FIG. 7, the collective network can carry out the action the secondary user 6 wishes to take regarding the object. For example, in the embodiment discussed herein, the collective network can send one of the secondary users 6 from the first collective network locations at which the secondary user 6 can find the video game system based on the secondary user's current location (i.e. through GPS, etc.), the secondary user's home location, the secondary user's work location (i.e. through the profile information), a secondary user's wish list or shopping list which may alert the user that the product he is viewing is wanted by a secondary user 6, etc.

As illustrated in block 670 of FIG. 7, the collective network application 17 can send the transaction details to the account application 27 at the financial institution in order to settle any financial accounts between the users in the collective network, the merchants where the object was purchased, and/or the financial institution. For example, the if the primary user 4 purchases the video game system for the secondary user 6 the collective network application 17 can direct the financial account applications 27 to transfer the necessary funds from the account of the secondary user 6 to the account of the primary user 4.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such objects to assist the user with commerce activity. The commerce activity may include, but is not limited to; conducting a transaction, providing information about a product/service, providing rewards based information, providing user-specific offers, or the like. In specific embodiments, the data that matched the images in the real-time video stream is specific to financial institutions, such as customer financial behavior history, customer purchase power/transaction history and the like. In this regard, some of the embodiments herein disclose leveraging financial institution data, which is uniquely specific to financial institutions, in providing information to mobile device users in connection with real-time video stream analysis.

Various embodiments or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

The systems, methods, computer program products, etc. described herein, may be utilized or combined with any other suitable AR-related application. Non-limiting examples of other suitable AR-related applications include those described in the following U.S. Provisional patent applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,407 | Apr. 22, 2011 | Providing Information Associated With an Identified Representation of an Object |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for utilizing one or more collective networks of users with image capture devices to identify objects captured using the image capture devices and provide offers to users within the one or more collective networks of users, the system comprising:

a memory device having computer readable program code store thereon;

a communication device; and a processing device operatively coupled to the memory device, and the communication device, wherein the processing device is configured to execute the computer readable program code to:

receive a real-time video stream, wherein the video stream is captured through the use of a first data capture device in communication with a first mobile device of a first user in the one or more collective networks of users;

identify a first object from the video stream;

retrieve data about the first object;

present the data about the first object to the first mobile device, wherein presenting the data about the first object comprises superimposing the data about the first object over the video stream on the first mobile device of the first user;

determine a notification preference associated with the first object, wherein the notification preference comprises at least a notification type, one or more objects, and one or more users;

determine that a second user within the one or more collective networks of users is interested in a second object based on the data about the first object and the notification preference, wherein each user within the one or more collective networks of users has a mobile device with an image capture device associated with the mobile device, wherein each image capture device is configured to capture images of the one or more objects, wherein each mobile device is configured to receive data about the one or more objects;

present a notification about the second object to a second mobile device of the second user based on at least the notification preference, wherein the notification is presented when it is determined that the second user is interested in the second object, wherein the notification is presented as a video link of the video stream on the second mobile device of the second user, and wherein the video stream comprises data about the second object superimposed on the video stream;

receive a response from the second user, wherein the response further comprises one or more actions the second user wishes to take in response to receiving the notification, wherein the one or more actions comprises at least an indication to purchase the second object;

transmit a request received from the second user to the first user to purchase the second object, wherein the request comprises providing the first user with access to funds associated with a financial institution account of the second user by providing information associated with the financial institution account of the second user to the first user, and wherein the second user is virtually present via the one or more collective networks of users; and receive an indication that the first user placed an order for the purchase of the second object for the second user using the funds accessed from the financial institution account of the second user.

2. The system of claim 1, wherein the processing device configured to execute the computer readable program code to determine if the second user within the one or more collective networks of users is interested in the second object is further configured to determine the first user from which the data about the first object was received.

3. The system of claim 1, wherein the processing device configured to execute the computer readable program code to determine if the second user within the one or more collective networks of users is interested in the second object is further configured to determine the one or more collective networks of users to which the first user belongs.

4. The system of claim 1, wherein the processing device configured to execute the computer readable program code to determine if the second user within the one or more collective networks of users is interested in the second object is further configured to determine the one or more users that belong to the one or more collective networks of users.

5. The system of claim 1, wherein the processing device configured to execute the computer readable program code to determine if the second user within the one or more collective networks of users is interested in the second object is further configured to compare the data received about the first object to a group of one or more objects associated with the one or more users that belong to the one or more collective networks of users.

6. The system of claim 5, wherein the group of one or more objects associated with the one or more users is a wish list, shopping list, or object transaction history associated with the one or more users.

7. The system of claim 1, wherein the first object and the second object are the same.

8. The system of claim 1, wherein the second object is similar to or related to the first object.

9. The system of claim 1, wherein the processing device is further configured to execute the computer readable program code to receive a request from the first user or the second user to create the one or more collective networks of users.

10. The system of claim 1, wherein the processing device is further configured to execute the computer readable program code to receive a request from the first user or the second user to create a first user profile or a second user profile for the one or more collective networks of users.

11. The system of claim 1, wherein the processing device is further configured to execute the computer readable program code to receive a request to link and authenticate a first user profile or a second user profile to an account of the first user or the second user at a financial institution.

12. The system of claim 1, wherein the processing device is further configured to execute the computer readable program code to receive a request to link one or more objects to a first user profile or a second user profile.

13. The system of claim 1, wherein the processing device is further configured to execute the computer readable program code to receive a request to invite the one or more users to join the one or more collective networks of users.

14. The system of claim 1, wherein the processing device is further configured to execute the computer readable program code to receive a request to allow the one or more users to join the one or more collective networks of users.

15. The system of claim 1, wherein the processing device is further configured to execute the computer readable program code to post and settle the accounts of the first user, the second user, a financial institution, or a merchant after the second user makes a purchase of the first object or the second object.

16. The system of claim 1, wherein the processing device is configured to execute the computer readable program code to receive an indication from the second user to place the second object on hold for a predetermined period of time.

* * * * *